(12) United States Patent
Shogren

(10) Patent No.: US 6,312,826 B1
(45) Date of Patent: Nov. 6, 2001

(54) PAPER COATED WITH POLYMERIZED VEGETABLE OILS FOR USE AS BIODEGRADABLE MULCH

(75) Inventor: Randal L. Shogren, Peoria, IL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/233,761

(22) Filed: Jan. 15, 1999

(51) Int. Cl.$^7$ .............................. B32B 9/06; B32B 23/08; B32B 25/06
(52) U.S. Cl. .......................... 428/507; 428/496; 428/499; 428/511; 523/123; 523/124; 47/9
(58) Field of Search ..................................... 428/499, 496, 428/507, 511; 523/123, 124; 47/9

(56) References Cited

U.S. PATENT DOCUMENTS

| | | |
|---|---|---|
| 1,870,110 | 8/1932 | Hall . |
| 5,163,247 | * 11/1992 | Weber et al. ............................... 47/9 |
| 5,866,269 | * 2/1999 | Dalebroux et al. ................ 428/537.5 |
| 6,029,395 | * 2/2000 | Morgan ...................................... 47/9 |

FOREIGN PATENT DOCUMENTS

| | | |
|---|---|---|
| 370482 | 4/1932 | (GB) . |
| 9615203 | 5/1996 | (WO) . |

OTHER PUBLICATIONS

R.L. Shogren et al., "Prospects for Biodegradable Mulch Films", Proceedings of 27th Annual National Agricultural Plastics Congress, Feb. 18–21, 1998, p. 238.

R.L. Shogren, "Preparation and Characterization of a Biodegradable Mulch: Paper Coated With Polymerized Vegetable Oils", Polymer Preprints 39(2), Aug. 1998, pp. 91—92.

R.P. Wool et al., "Affordable Composites From Renewable Sources (Acres)", Polymer Preprints 39(2), Aug. 1998, p. 90.

Lina Zhang et al., "Biodegradability of Regenerated Cellulose Films in Soil", Ind. Eng. Chem. Res. 1996, 35, pp. 4682–4685.

D. F. Anderson et al., "Evaluation of a Paper Mulch Made from Recycled Materials as an Alternative to Plastic Film Mulch for Vegetables", J. Sustain Agric., 7, 1995, pp. 39–61.

Chemical Abstract Number 94:32550, Feb. 2, 1981.

Chemical Abstract Number 120:10457, Jan. 10, 1994.

Chemical Abstract Number 114:45320, Feb. 4, 1991.

* cited by examiner

*Primary Examiner*—P. Hampton-Hightower
(74) *Attorney, Agent, or Firm*—M. Howard Silverstein; Curtis P. Ribando; John D. Fado

(57) ABSTRACT

Biodegradable, agricultural mulches are prepared by coating paper with a cross-linked drying oil or a cross-linked, functionally modified drying oil. These mulches are inexpensive to produce, and are also water-resistant, mechanically stable and highly effective as weed barriers. The reactivities of various drying oils permit the development of a broad spectrum of coating systems and coating properties. In one embodiment of the invention, it is contemplated to complete cross-linking of coated paper in the field through either oxidative or photoinitiated processes.

22 Claims, 10 Drawing Sheets

PAPER COATED WITH POLYMERIZED VEGETABLE OILS FOR USE AS BIODEGRADABLE MULCH

BACKGROUND OF THE INVENTION

1. Field of the Invention

Figure 1:
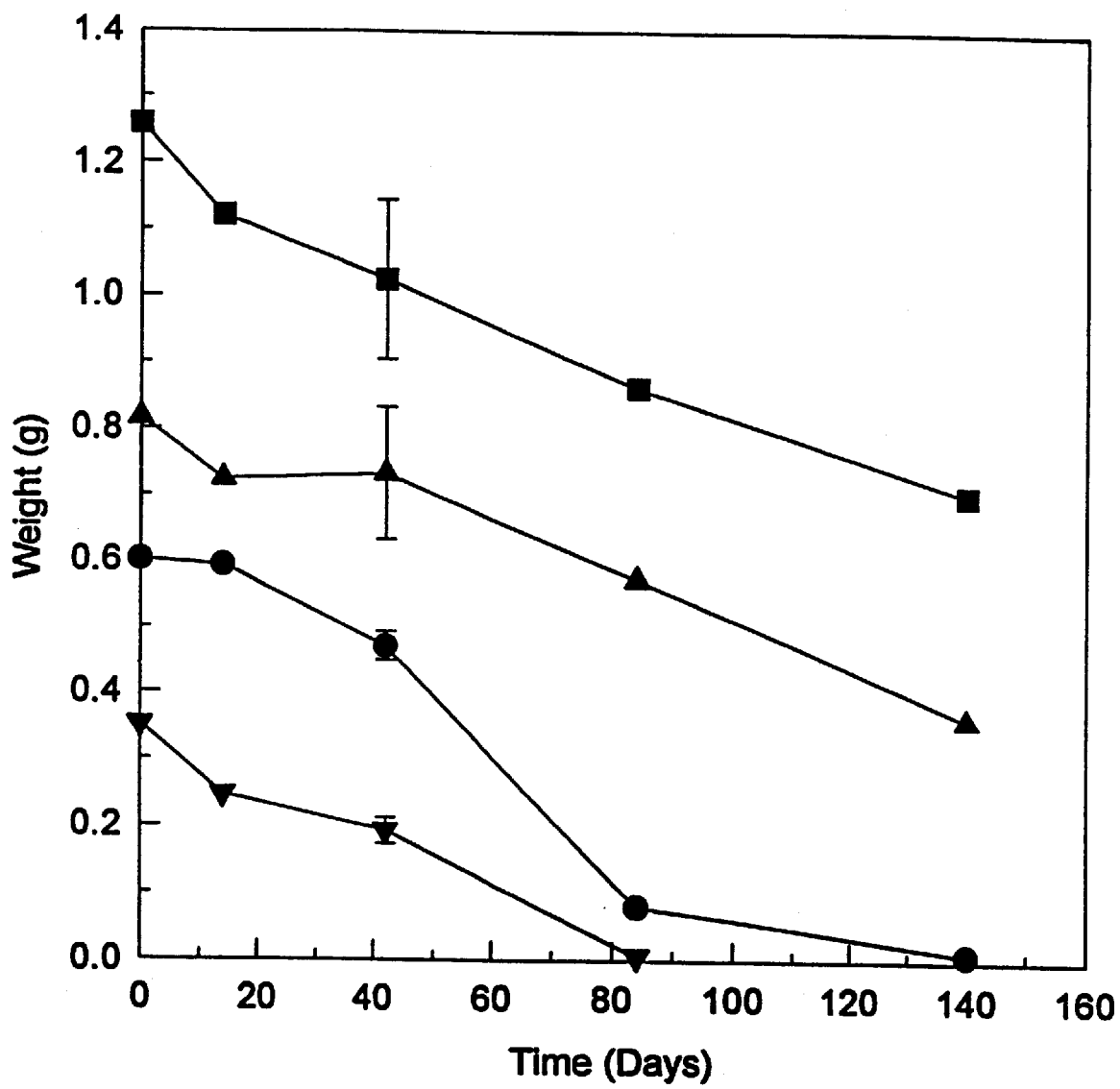

Polyethylene films are used extensively in agriculture as greenhouse covers, forage covers and agricultural mulch. Worldwide yearly consumption for polyethylene mulch film alone is currently over 1 billion pounds (M. H. Jensen, presentation at 27th National Agricultural Plastics Congress, 1998). Plastic mulches and row covers help retain soil moisture, increase soil temperature, inhibit weed growth, reduce insect damage and thereby increase yields (D. F. Anderson, M. A. Garisto, J. C. Bourrut, M. W. Schonbeck, R. Jaye, A. Wurzberger and R. DeGregorio, *J. Sustain. Agric.* 7, 39–61, 1995; J. W. Courter, University of Illinois Cooperative Extension Service Circular No. 1009, Champaign, Ill., 1969; D. E. Hill, L. Hankin and G. R. Stephens, Connecticut Agric. Exp. Sta. Bull. No. 805, New Haven, Conn., 1982). Most mulches are used for vegetable and fruit production due to their relatively high value. Disposal or recycling of polyethylene films, however, has become a daunting problem. Agricultural mulch, in particular, is very difficult to recycle due to contamination with dirt and debris as well as loss in mechanical properties from UV catalyzed oxidation. Many landfills reject mulch film because of pesticide residues and thus it must be treated as hazardous waste (B. Hofstetter, *New Farm* 13, 56–57, 1991). A biodegradable mulch would have the dual advantages of avoiding costs of removal and disposal as well as contributing humus to the soil.

This invention relates to a biodegradable, water resistant, agricultural mulch that is produced from paper and a cross-linked drying oil.

2. Description of the Prior Art

Several different types of degradable mulch have been considered including polyethylene film containing prooxidants (W. J. Maddever and G. M. Chapman, Proceedings of the Soc. Plast. Eng. 47th Ann. Tech. Conf., 1352–1355, 1989), starch-polyvinyl (PVOH) alcohol films (F. H. Otey, A. M. Mark, C. L. Mehltretter and C. R. Russell, *Ind. Eng. Chem. Prod. Res. Develop.* 13, 90–92, 1974), biodegradable polyester films (J. M. Mayer and D. L. Kaplan, *Trends in Polym. Sci.* 2, 227–235, 1994) and coated paper or fiber mats (J. Vandenberg and J. Tiessen, *Hortscience* 7, 464–465. 1972 and A. Bastiaansen, A. Hanzen, D. DeWit and H. Tournois, PCT Int. Pat. Appl. WO9609355, 1996). Although polyethylene films will disintegrate, resulting fragments may require decades to completely biodegrade, and toxicity of degradation products is largely unknown (A. C. Albertsson and S. Karlsson, *J. Appl. Polym. Sci.* 35, 1289–1302, 1988). Starch-PVOH films have rather poor resistance to water and thus would not be expected to maintain their integrity during rain. Progress is being made on laminating starch-PVOH films with different types of water-resistant, biodegradable polyesters (J. W. Lawton, in *Cereals, Novel Uses and Processes,* Plenum Press, New York, 1997, p. 43–47). Although biodegradable polyesters such as polylactic acid, polycaprolactone and polybutylene succinate have excellent mechanical properties (J. M. Mayer and D. L. Kaplan, *Trends in Polym. Sci.* 2, 227–235, 1994), their cost ($2–8/lb.) is much higher than for polyethylene ($0.4/lb. resin, $1–2/lb. film) (D. F. Anderson, M. A. Garisto, J. C. Bourrut, M. W. Schonbeck, R. Jaye, A. Wurzberger and R. DeGregorio, *J. Sustain. Agric.* 7, 39–61, 1995 and Anonymous, *Plastics Technol.,* May, 1998, p. 87). Uncoated paper, although inexpensive ($0.28/lb. for kraft paper) (Anonymous, *North American Pulp and Paper Yearbook,* Resource Information Systems, Charlottesville, Va., 1996, 95), degrades too rapidly to protect most crops adequately (D. F. Anderson, M. A. Garisto, J. C. Bourrut, M. W. Schonbeck, R. Jaye, A. Wurzberger and R. DeGregorio, *J. Sustain. Agric.* 7, 39–61, 1995).

Various types of coatings for paper have been developed to slow degradation and improve wet strength. Rivise (C. W. Rivise, *Paper Trade J.* 89, 55–57, 1929), Hutchins (A. E. Hutchins, Minn. Agr. Expt. Sta. Bull. No. 298, 1933) and Flint (L. H. Flint, U.S. Dept. of Agric. Tech. Bull. No. 75, 1928), have reviewed some of the early work on the use of paper mulches. In 1870, the first U.S. patent pertaining to utilization of paper as a mulch described the use of tarred paper to exclude insects from roots (S. Brunson, U.S. Pat. No. 104,418, 1870). By the 1920's, chiefly through the work of Eckart in Hawaii on sugar cane and pineapple, the dramatic advantages of tar or asphalt coated paper for improving yields of fruits and vegetable became apparent. Paper impregnated with paraffin wax (V. Z. Tzelik, Russ. Pat. 28,223, 1930) and animal or vegetable oils (W. A. Hall, Brit. Pat. 370,482, 1931) were also claimed for mulch use. With the advent of synthetic polymers in the 1940's and 1950's, polyethylene largely displaced paper in mulching applications, likely due to its low cost and excellent strength and flexibility.

Recently, however, there has been a resurgence in research and practical interest in coated paper mulches, probably due to concerns about disposal of polyethylene as well as the desire of organic farmers to have a natural, totally degradable mulch. Most of the coatings considered have been synthetic polymers such as polyethylene (J. W. Courter, University of Illinois Cooperative Extension Service Circular No. 1009, Champaign, Ill., 1969 and J. Vandenberg and J. Tiessen, *Hortscience* 7, 464–465, 1972), or various polymer latexes (G. E. Shanley and M. J. Lubar, Brit UK Pat. Appl. GB2158058, 1985; R. E. Weber and M. L. Delucia, Eur. Pat. Appl. EP454104, 1991; C. Desmarais, Can. Pat. Appl. CA2092963, 1994; R. F. Lippoldt and W. W. Woods, U.S. Pat. No. 3,427,194, 1969 and J. S. Vandemark and R. T. Seith, U.S. Pat. No. 3,939,606, 1976). Non-woven mats of cellulosic fibers and polyesters have also been considered (R. A. Clendinning, J. E. Potts and W. D. Niegisch, U.S. Pat. No. 3,850,863, 1976 and S. H. Monroe, J. A. Goettmann and G. A. Funk, U.S. Pat. No. 5,532,298, 1996). Anderson et al (D. F. Anderson, M. A. Garisto, J. C. Bourrut, M. W. Schonbeck, R. Jaye, A. Wurzberger and R. DeGregorio, J. Sustain. Agric. 7, 39–61, 1995) recently showed that the rate of loss of tensile strength of paper in soil can be slowed slightly by soaking it in soybean oil. Zhang et al (L. Zhang, H. Liu, L. Zheng, J. Zhang, Y. Du and H. Feng, *Ind. Eng. Chem. Res.* 35, 4682–4685, 1996) found that coating a regenerated cellulose film with a thin layer of tung oil followed by polymerization slowed weight loss in soil (half life increased from 30 to 37 days).

SUMMARY

We have now discovered that paper treated with a coating comprising a cross-linked drying oil or cross-linked, functionally modified drying oil exhibits many of the desired properties of a biodegradable, water-resistant agricultural mulch needed for present day applications. The reactivities of the various drying oils permit the development of a broad spectrum of coating systems and coating properties. For example, partial or complete cross-linking of the drying oil-coated paper may occur in the field through either oxidative or photoinitiated processes.

In accordance with this discovery, it is an object of the invention to provide novel compositions of matter comprising a paper substrate coated, and/or impregnated, with a treatment comprising a polymerized drying oil.

Another object of the invention is to provide an inexpensive, biodegradable agricultural mulch that is water-resistant, mechanically stable and highly effective as a weed barrier.

It is also an object of the invention to develop a system for tailoring the production scheme and functional properties of an agricultural mulch to a particular end use application.

Other objects and advantages of the invention will be readily apparent from the ensuing description.

DETAILED DESCRIPTION OF THE INVENTION

The basic substrate for use in this invention is paper. The term "paper" is in its broadest sense refers to any sheet or continuous web of intermeshed fibrous material. Typically, these sheets or webs are formed by depositing fibers of vegetable, mineral, animal or synthetic origin from a fluid suspension into a thin layer, and thereafter removing the fluid and drying the resulting sheet or web. For purposes of the invention, the fiber should be predominantly biodegradable, and is therefore preferably derived from a cellulosic raw material, such as wood pulp, kenaf, rag, straw, bagasse, recycled paper, etc. The paper may also be treated with additives and coatings conventionally used in the paper-making industry, provided that these treatments do not interfere with the cross-linked drying oil treatments of this invention. It is also contemplated that paper pulp can be treated with the coating materials described, below, and the treated pulp can then be pressed under conditions of heat and pressure into a mat. For purposes of economy and performance, a preferred paper for use herein is conventional kraft paper.

The biodegradable paper coatings of the invention are defined in reference to Formula I:

Formula I

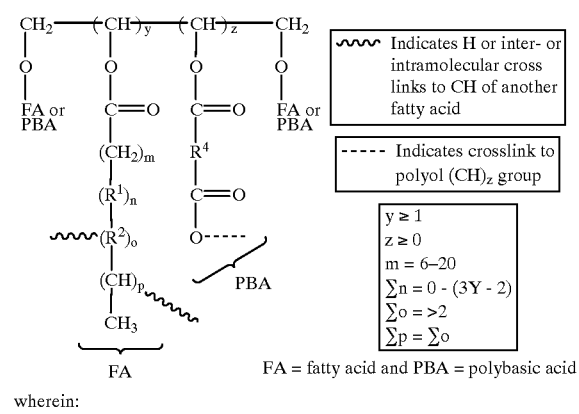

wherein:

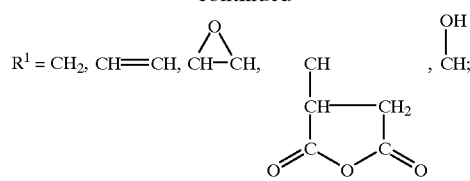

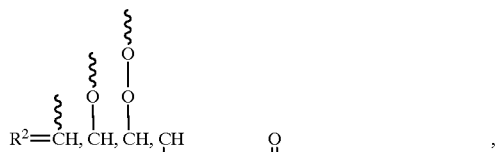

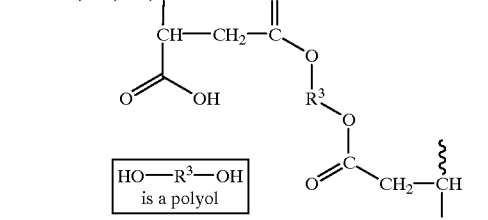

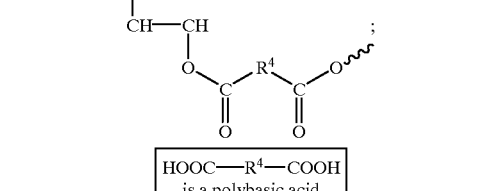

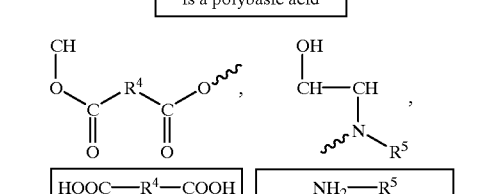

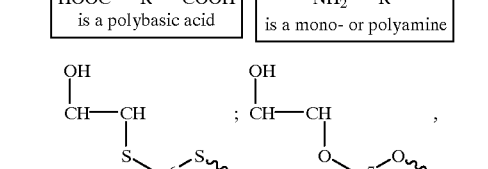

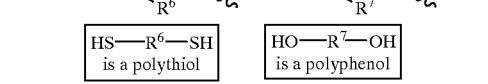

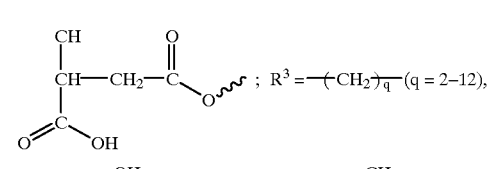

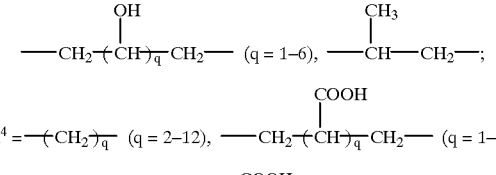

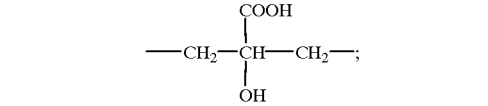

-continued

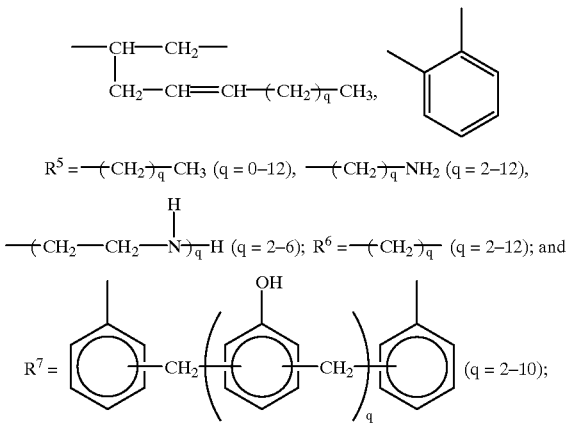

wherein the exact arrangement of $CH_2$, $R^1$, $R^2$ and $CH$ groups relative to one another depends on the type of fatty acid and on the rearrangement after radical activation or conjugation.

The actual coating that is applied to the paper sheet is: (1) a polymer having the structure of Formula I; (2) a combination of (a) a drying oil that will polymerize to yield a polymer having the structure of Formula I in a polymerization reaction and (b) a catalyst to promote said polymerization reaction; or (3) a combination of (a) a functionally modified drying oil that will polymerize to yield a polymer having the structure of Formula I in a polymerization reaction and (b) a catalyst to promote said polymerization reaction.

The drying oils contemplated herein include plant, animal, synthetic and semi-synthetic glycerides, particularly triglycerides, that can be transformed into hard, resinous materials (see Encyclopedia of Polymer Science and Technology, ed. H. F. Monk et al., John Wiley & Sons, 1966, pp. 216–234). The expression "drying oils" is generic to both drying oils, which dry (harden) at normal atmospheric conditions, and semidrying oils, which must be baked at elevated temperatures in order to harden. Unless otherwise indicated, "drying oil" will be used herein in its broadest sense to refer to both types of drying oil. The unsaturated fatty acids of a drying or semidrying oil comprise double bonds that are readily available for entering into oxidative or other reactions involved in the drying process. Common sources of drying oils include castor oil, fish oils, linseed oil, oiticica oil, safflower oil, soybean oil, sunflower oil, and tung oil. Of course the oils that contain the higher levels of polyunsaturated fatty acids, such as soybean oil, linseed oil and safflower oil are the most reactive in terms of having available sites for cross-linking.

The drying oils may be polymerized (i.e. cross-linked) through a variety of mechanisms, linkages, and cross-linkers. For instance, the cross-linking may be "intra", that is, between fatty acid ester chains on the same triglyceride; or it may be "inter", that is, between a fatty acid ester chain of one triglyceride and a fatty acid ester chain on another triglyceride. The cross-linking, whether intra or inter, may be directly from one methylene group to another, or may involve a linker, such as that resulting from reaction of an epoxidized oil with a curing agent, such as a polyol, a polybasic acid, an amine, a polyamine, a polythiol, or a polyphenol. Specific exemplary reagents for this purpose include:

polyols: ethylene glycol, glycerol, sorbitol, propylene glycol, and oligomers thereof; as well as hydroxylated oils such as castor oil polybasic acids: succinic acid, adipic acid, butane tetracarboxylic acid, citric acid, succinic anhydride, octenylsuccinic anhydride, and phthalic anhydride;

amines: octylamine, and ethylamine;

polyamines: ethylene diamine and triethylene tetramine;

polyphenols: phenol-formaldehyde resin

A preferred curing agent is citric acid, because of its rapid rate of reaction with epoxidized oil at relatively low temperatures. Another approach to cross-linking is to react the drying oil with maleic anhydride and then react the maleated oil with a polyol. Also contemplated herein are cross-linked alkyds having a structure in accordance with Formula I wherein $z \geq 1$. Alkyds would typically be produced by reacting a polyol with a polybasic acid and free fatty acids.

In one preferred embodiment of the invention, the drying oil is simply reacted with oxygen to form hydroperoxides which decompose to form various free radicals in the presence of a drying catalyst; particularly, metal ion catalysts, such as cobalt, manganese, copper, chromium, iron and calcium. The radicals then combine to form carbon-oxygen or carbon-carbon cross-links.

In another preferred embodiment, the drying oil is first either partially or completely epoxidized. The resultant oxirane rings are then available for photoinitiated cross-linking. Optionally, the epoxidized oil and a catalyst can be coated on the paper, and the cross-linking would then take place when the paper is exposed to sunlight in the field. Alternatively, the epoxidized oil may be reacted with a curing agent to modify the drying oil by addition of a linker as described above. When acidic catalysts such as quaternary ammonium halides are used as catalysts in the latter reaction, the primary reaction product is a polyester containing a secondary hydroxyl group β to the carboxyl carbon. Other catalysts for effecting polymerization across the oxirane ring are well established in the art.

Partial polymerization is easily controlled by regulating the temperature of reaction. For example, the reaction can be stopped by rapidly lowering the temperature of the mixture, as in ice water, prior to applying the partially polymerized oil onto the paper. The reaction is then easily completed at a later time, such as by passing the treated paper through an oven, or the like. Partially reacted epoxidized oils are available for photoinitiated cross-linking through the remaining oxirane rings. For the partially epoxidized oils, oxidative cross-linking can be promoted between remaining sites of unsaturation and reactive functional groups introduced by the curing agent. As indicated above, both the photoinitiated cross-linking and the oxidative cross-linking of the coated paper can be completed in the field.

The drying oil or modified drying oil is applied to the paper by any conventional means such as by spraying, wiping, or by passing the paper through a bath. The catalyst can be blended with the oil or applied to the paper as a separate stage. In order to interrupt or completely delay cross-linking until the coated paper is put into use, the sheet can be simply wound into a roll in order to exclude both oxygen and/or light needed to initiate the remaining cross-linking reaction. Of course it is understood that the viscosity of the drying oil applied to the paper can be controlled by partial cross-linking or by partial polymerization prior to applying the oil to the paper. As discussed further below, this approach may be desirable when control over impregnation into the paper is needed.

The nature of the coating treatment on the paper is a function of a number of variables including the porosity of the paper, the initial viscosity of the treatment material, the mode and application rate of the treatment material, the contact period of the paper and treatment before the drying oil becomes completely cross-linked, the temperature during the contact period and the like. For example, the more porous the paper and the more fluid the treatment material, the more of the treatment material that will become absorbed by the paper. Likewise, the longer the period of contact between the paper and the drying oil before completing the cross-linking, the more the drying oil will tend to impregnate the paper. Conversely, by increasing the density of the paper or the viscosity of the treatment material, or by shortening the period of contact before completing the cross-linking, the amount of material absorbed by the paper can be reduced. It is envisioned that the extent of penetration of the treatment into the paper can be controlled over a broad continuum; but that typically some of the material will be absorbed, and some of the material will ultimately reside as a coating over the one or more of the surfaces of the paper. For purposes of this invention, the terms "treatment" and "coating" as used herein include material that may actually be absorbed into (i.e. penetrate or impregnate) the fibrous structure of the paper. Additionally, it is to be understood that the treatment may be applied to one or both surfaces (i.e. sides) of the paper sheet, and that the treatment may comprise non-cross-linked drying oil, or drying oil in various stages of cross-linking.

The polymerization reactions contemplated for use herein and described above are all well known. Accordingly, determination of the appropriate conditions (e.g. time, temperature, and catalyst) for conducting a particular reaction would be well within the skill of the person in the art. Likewise, tailoring these conditions to achieve a particular result in the coating step would be within the skill of the ordinary artisan. For most applications, the coating weight would be in the range of about 10–300% (7–200 g/m$^2$) of the paper for a given area. Usually, the level of coating will be in the range of 25–100% (15–65 g/m$^2$), with the preferred amount being in the range of 40–80% (25–55 g/m$^2$).

A variety of additives may be included in the coating treatment. For example, the optional addition of a darkening or opacifying agent such as carbon black, charcoal or dark organic dye to the polymerized oil or the paper are commonly used in plastic mulches to screen out the sun and thus make it more difficult for plants to grow underneath. Also, pigments of other colors may be added to help regulate the soil temperature or control the growth response of the cultivated plants. Of course, fertilizers, pesticides, fungicides, biocontrol agents, biodegradation enhancers and the like may optionally be added to the coating.

The coated paper products of this invention have utility as agricultural mulches for all the same applications for sheeted mulches as known in the art. That is, they can be rolled out in orchards, gardens, fields, and potted plants for the purposes of retaining soil moisture, increasing soil temperature, inhibiting weed growth, and reducing insect damage. At the end of the growing season, or whenever the benefit of the mulch is no longer needed, the mulch is simply cultivated into the soil and allowed to biodegrade. It is apparent from the data in Example 5 that coating with vegetable oil resins extends the useful life of paper mulches to a length of time close to that required for many crops (about 10 weeks).

The treated paper of this invention is characterized by at least comparable, and in some cases, significantly improved, mechanical and functional properties as compared to untreated paper or to paper treated with the same amount (comparable add on) of nonpolymerized oil. For instance, as shown in the Examples below, treated kraft paper exhibits at least a two-fold increase in elongation to break vs. untreated paper. In a soil burial test, treated samples exhibit at least two-fold, and in some cases several-fold, increase in the half life over untreated paper. As a barrier to plants, tests described in the Examples show that the treated paper reduces penetration by plants up to 80% after 84 days as compared to the untreated control.

EXAMPLES

Materials used in the ensuing examples were as follows:

Brown kraft paper having a weight of 66 g/m$^2$. Raw linseed oil was obtained from Alnoroil Co., Valley Stream, N.Y. and had an iodine value of >177 and a saponification value of 189–195. Cobalt octoate solution (6% Co in mineral spirits) was obtained from Pfaltz & Bauer. Epoxidized soybean oil was Paraplex G-62 from C. P. Hall Co., Bedford Park, Ill. and had about 7% oxirane oxygen. Citric acid and tetrabutylammonium bromide were reagent grade and were purchased from Aldrich Chem. Co. Citric acid was ground with a mortar and pestle and passed through an 80 mesh screen prior to use.

Abbreviations for coating treatments used in the examples are as follows:

LO = linsead oil
SO = soybean oil
ESO = epoxidized soybean oil
CA = citric acid
TBABr = tetrabutylammonium bromide Examples 1–5 relate to the first year trials and Example 6 relates to the second year trials. Legends for FIGS. 1–10 are as follows: uncoated kraft paper (▼), uncatalyzed LO coated paper (○), catalyzed LO coated paper (●), ESO/CA coated paper (▲), ESO/CA/TBABr coated paper at 147% add-on (■), ESO/CA/TBABr coated paper at 51% add-on (□), uncatalyzed SO at 56.4% add-on (↑), catalyzed SO at 71.8% add-on (♦), uncatalyzed SO at 38.6% add-on (◯), catalyzed SO at 25% add-on (●)

Example 1
Preparation of Paper Coated with Polymerized Linseed Oil

Linseed oil (LO, 120 g) and cobalt octoate solution (0.40 g) were magnetically stirred for 10 min. then the mixture was applied to pieces of kraft paper (50.8×91.4 cm) using a paint brush. The oil penetrated quickly into the paper due to its low viscosity. The coated paper was hung from a rope and allowed to "dry" overnight. Coating weight was approximately 45 g/m$^2$.

Fourier Transform Infrared Spectroscopy (FTIR)

Samples of paper coated with polymerized linseed oil (LO coated paper) were prepared for FTIR analysis were pulverized in liquid nitrogen using a Wig-L-Bug Amalgamator, mixed with KBr and pressed into pellets. Spectra were obtained using a Nicolet Impact 410 spectrometer. For LO coated paper, no absorbance corresponding to C—H stretching adjacent to carbon-carbon double bonds of LO (3010 cm$^{-1}$, data not shown) was seen, indicating that most of the double bonds reacted.

Example 2
Preparation of Epoxidized Soybean Oil-Based Polyesters

Epoxidized soybean oil (ESO, 349 g, 1.5 mole epoxy), citric acid (CA, 99 g, 1.5 mole carboxyl) and tetrabutylammonium bromide (TBABr, 3.2 g) were first partially polymerized by heating in a 3 l beaker equipped with an air stirrer and hot plate. After the temperature of the mixture reached 110° C. (about 10 min.), the beaker was placed into a bucket of ice to stop the reaction. Pre-polymerization was conducted in order to better disperse the CA in the ESO. The partially polymerized ESO resin was then spread onto paper sheets using glass rods. The ESO resin penetrated only part way into the paper due to its high viscosity. Polymerization was completed by placing the coated paper onto steel sheets covered with teflon/aluminum foil (Bytac, Norton Performance Plastics, Akron, Ohio) and heating in an oven at 165° C. for 3 min. A similar experiment was conducted without the TBABr catalyst to evaluate possible effects of TBABr on biodegradation rates, described in Example 3, below.

FTIR Analysis

The ESO/CA coated paper was analyzed by FTIR as described above in Example 1 for LO coated paper. The absorbances corresponding to citric acid carboxyl carbonyl stretch ($1701$ cm$^{-1}$) and epoxide ring vibration ($822$ cm$^{-1}$) disappeared, indicating that essentially all ESO and CA reacted. Interestingly, the reaction seems to occur with or without the TBABr catalyst.

DETAILED DESCRIPTION OF THE DRAWINGS

Example 3

Testing for Biodegradation in Soil

Coated papers as well as uncoated paper were cut into 5.08×10.16 cm pieces, weighed and sewn into nylon mesh bags having openings about 3 mm in size. Three replicates of each sample for each of 4 time points were then buried under 6 in. of soil in a field plot [National Center for Agricultural Utilization Research (NCAUR), Peoria, Ill.] starting on June 30. During summer weeks in which there was no rain, the plot was sprinkled with about 1.3 cm. of water. Samples were removed from the ground at 14, 42, 84 and 140 days. After removal, samples were brushed lightly, gently rinsed with deionized water, equilibrated for 7 days at 23° C. and 50% relative humidity, weighed and tested for tensile properties (see below). Average outdoor temperatures were about 21° C. over the first 3 months of the experiment and then declined gradually to 0° C. over the next 2 months. Rainfall was very light the first six weeks (<2 cm/week) and then increased.

The results are shown in FIG. 1. The higher initial (at 0 time) weight/area values of the coated papers reflect the added weight of the coating. Rates of weight loss during soil burial as a percentage of initial weight, were most rapid in uncoated paper, followed by LO coated paper and finally ESO/CA coated paper. Rates of decrease in weight and strength were similar for ESO/CA and ESO/CA/TBABr coated papers, suggesting that TBABr does not significantly impede biodegradation. Close examination of the buried samples show that uncoated paper had torn or disintegrated into small pieces by 6 weeks while the coated papers remained whole. After 12 weeks, LO coated paper has also disintegrated while the ESO/CA coated paper has begun to tear. There were no significant changes in the measured thicknesses with time up to 6 weeks so losses in weight were due to decreases in density and focal losses in area. Specimens were examined with a JEOL JSM 6400V scanning electron microscope. The resulting SEM photographs (not shown) revealed that, by 6 weeks, fungal cells and hyphae have extensively colonized the surface and interior of uncoated paper. Fibrillar breakage and defibrillation are evident. Fungal growth was also widespread on the surface of LO coated paper at 6 weeks but there was little penetration to the interior. The LO coating covers and fills the spaces between cellulose fibrils, so less surface area is available for microorganism growth. In contrast, the surface of ESO/CA coated paper showed only focal areas of microbial colonization after 6 weeks, suggesting that the ESO based resin may be more resistant to biodegradation than LO. It is somewhat surprising that LO coated paper appears to degrade faster than ESO/CA coated paper considering that the double bonds in LO are polymerized to single C—C or C—O bonds. The latter are normally thought to be more resistant to biodegradation than the ester linkages found in ESO/CA. However, the greater thickness of the ESO/CA coated paper or the greater ratio of resin to paper may also influence biodegradation rates.

It is apparent from FTIR spectra of coated papers after exposure to soil for 12 weeks (data not shown) that for LO coated paper, absorbances from the LO component ($2929$ and $2856$ cm$^{-1}$ from C—H stretching and $1741$ cm$^{-1}$ from C=O stretching) are greatly diminished relative to the cellulosic component ($1163$, $1059$, $1034$ cm$^{-1}$ from C—O stretching). The ESO/CA coated paper likewise showed a smaller preferential loss of the oil component. These data suggest that the polymerized oil coatings protect the cellulosic fibers from premature microbial attack by acting as a sacrificial barrier.

Example 4

Weed Growth Inhibition

Figure 2:
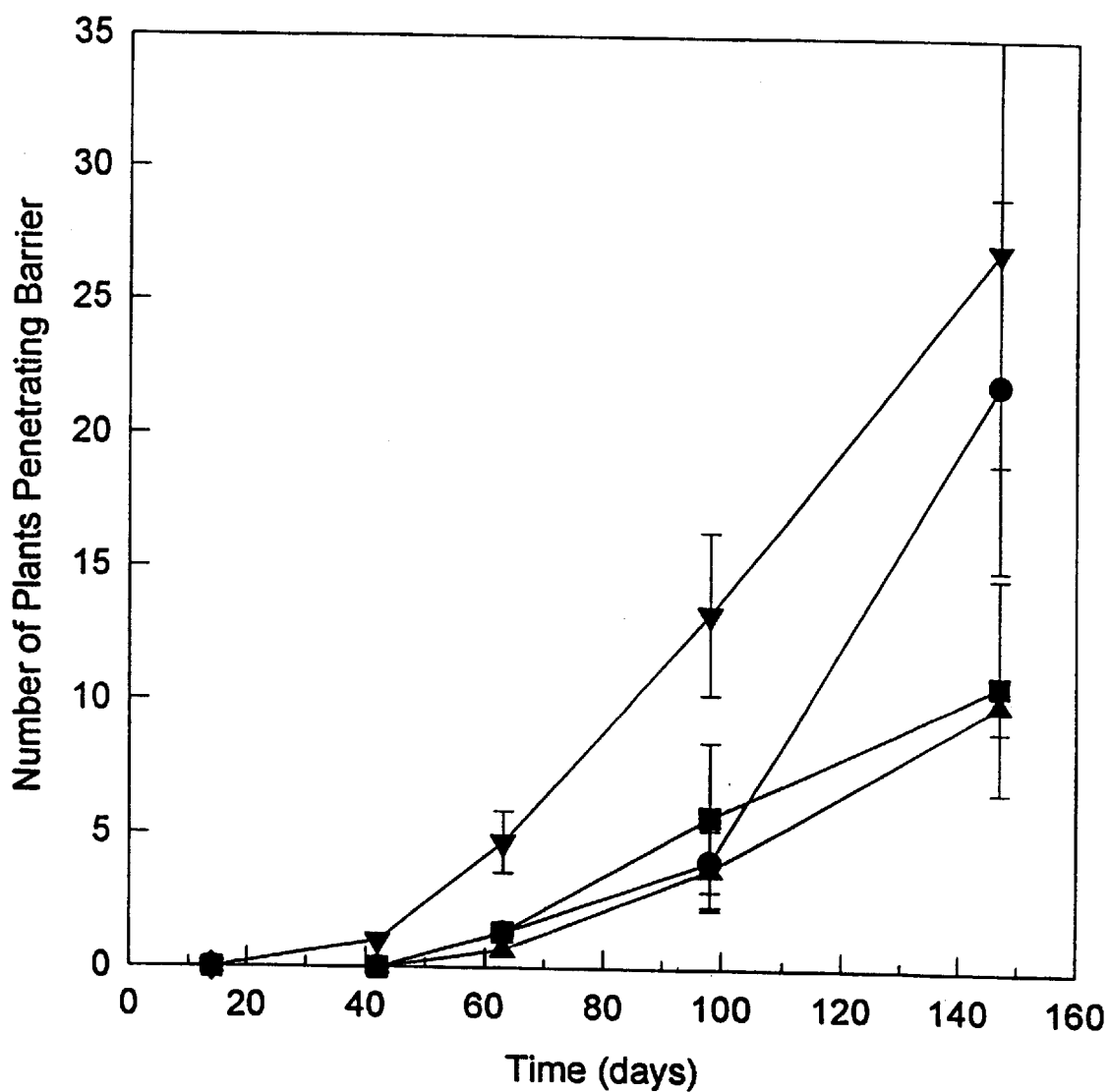

Three pieces of each of the coated papers and control (uncoated paper) 50.8×91.4 cm in size were placed onto rototilled ground in the NCAUR field plot. The outer edges (about 10 cm) of the samples were buried in the dirt to keep the samples stationary. The number of weeds protruding through openings in the samples were recorded over time (FIG. 2).

These data show that weed growth is most rapid for uncoated paper followed by LO coated paper then ESO/CA coated paper. This is consistent with the degradation data in Example 3. By 6 weeks, the uncoated paper had several tears or holes and weed growth through the paper began. Most of the uncoated paper on top of the soil disappeared (biodegraded and/or blown away) by 9 weeks. Loss of strength of uncoated paper during rain may also have contributed to its disintegration. In contrast, the coated papers remain mostly intact, albeit with some cracks and holes, up to 14 weeks.

Example 5

Tensile Testing and Elongation to Break Evaluation

Dog-bone type V tensile bars (4–5 for each sample) were cut and tested according to ASTM D638-91 using an Instron model 4201 Universal Testing Machine. Crosshead speed was 20 mm/min and gage length was 25.4 mm. Both tensile strength and elongation to break were evaluated in the Instron.

Figure 3:
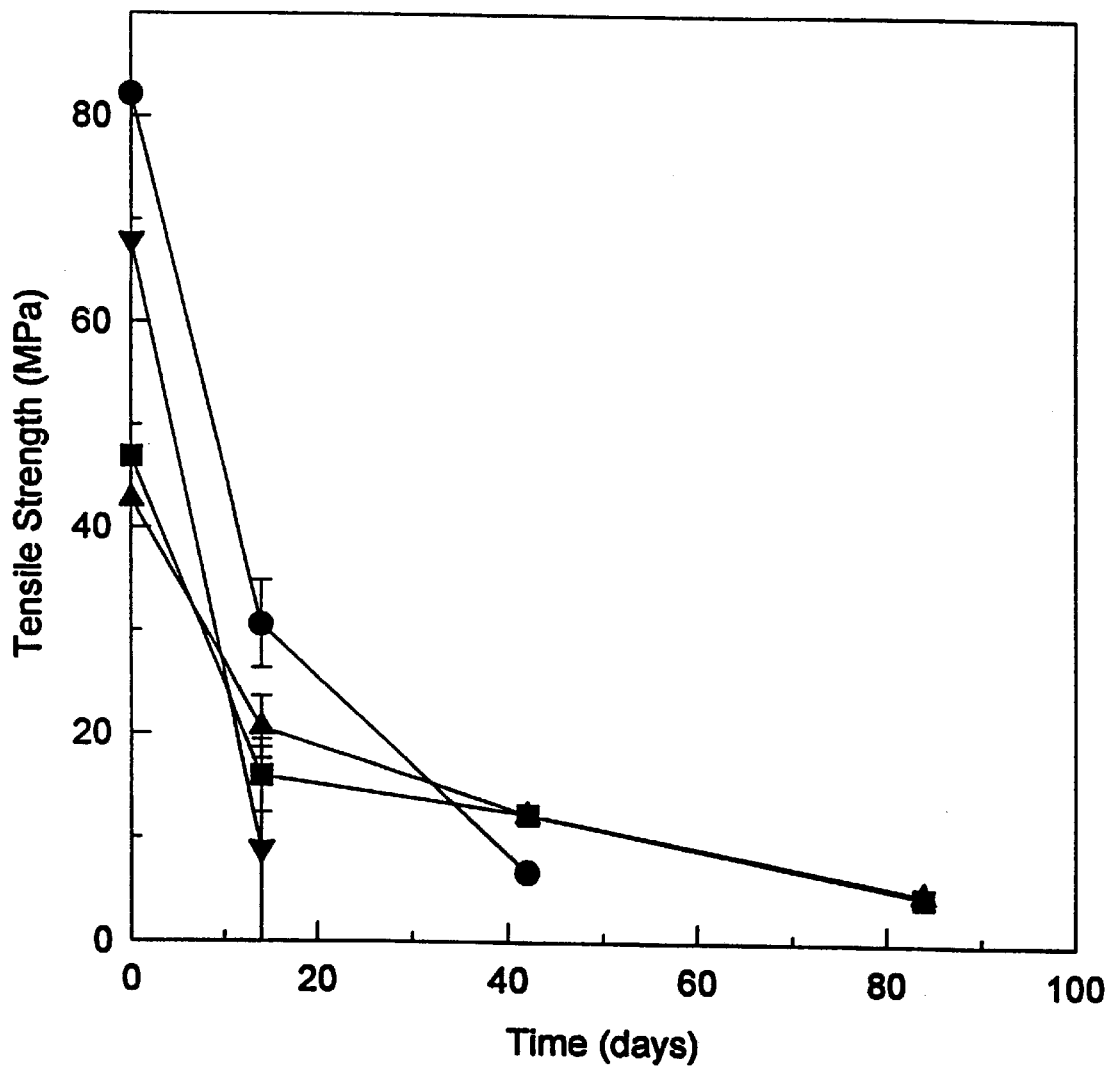

FIG. 3 shows that the initial tensile strength of LO coated paper (82 MPa) is slightly higher than for uncoated paper (68 MPa). Since the LO penetrated into the paper (the overall thickness was 85 μm for both LO coated paper and uncoated paper), overall strength per unit area is higher for LO coated paper since the polymerized oil replaces air. Likewise, tensile strengths of the ESO/CA and ESO/CA/TBABr coated papers (45 MPa) are lower than the uncoated paper because much of the weaker resin did not penetrate the paper (thickness 180 μm). Rates of decrease in tensile strength with time decreased in the order uncoated paper>LO coated paper>ESO/CA coated paper (FIG. 3).

Figure 4:
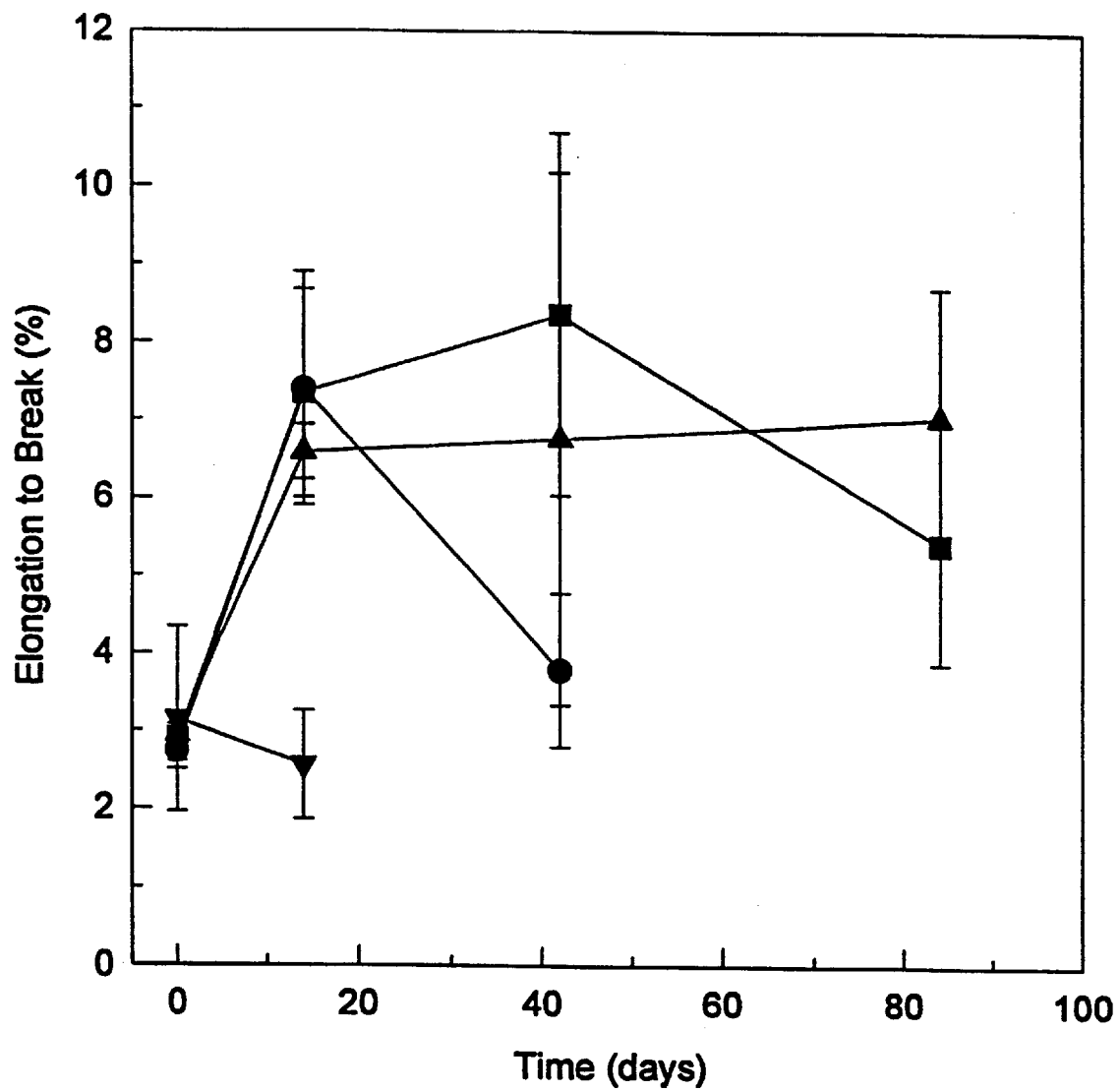
Figure 5:
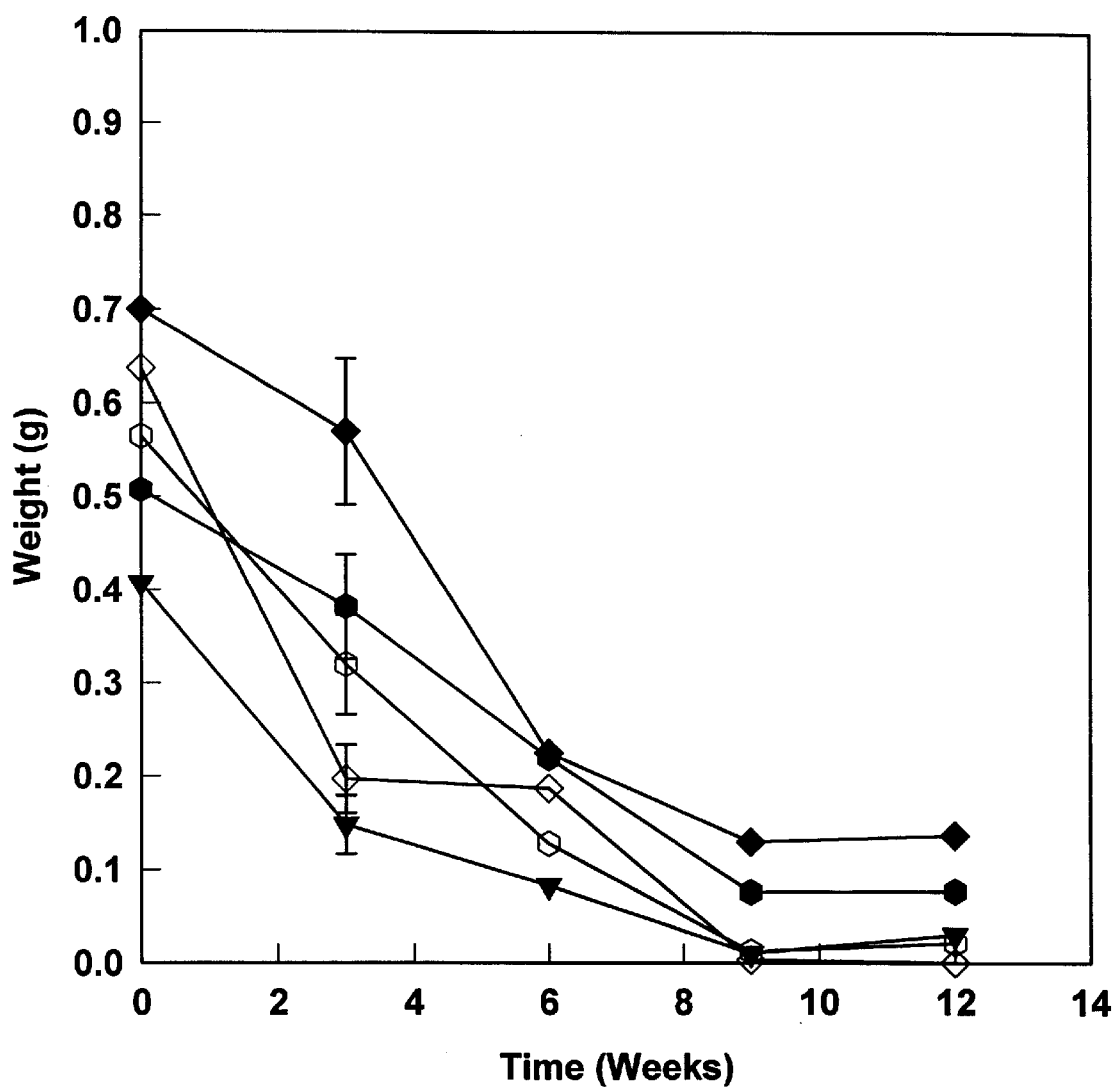
Figure 6:
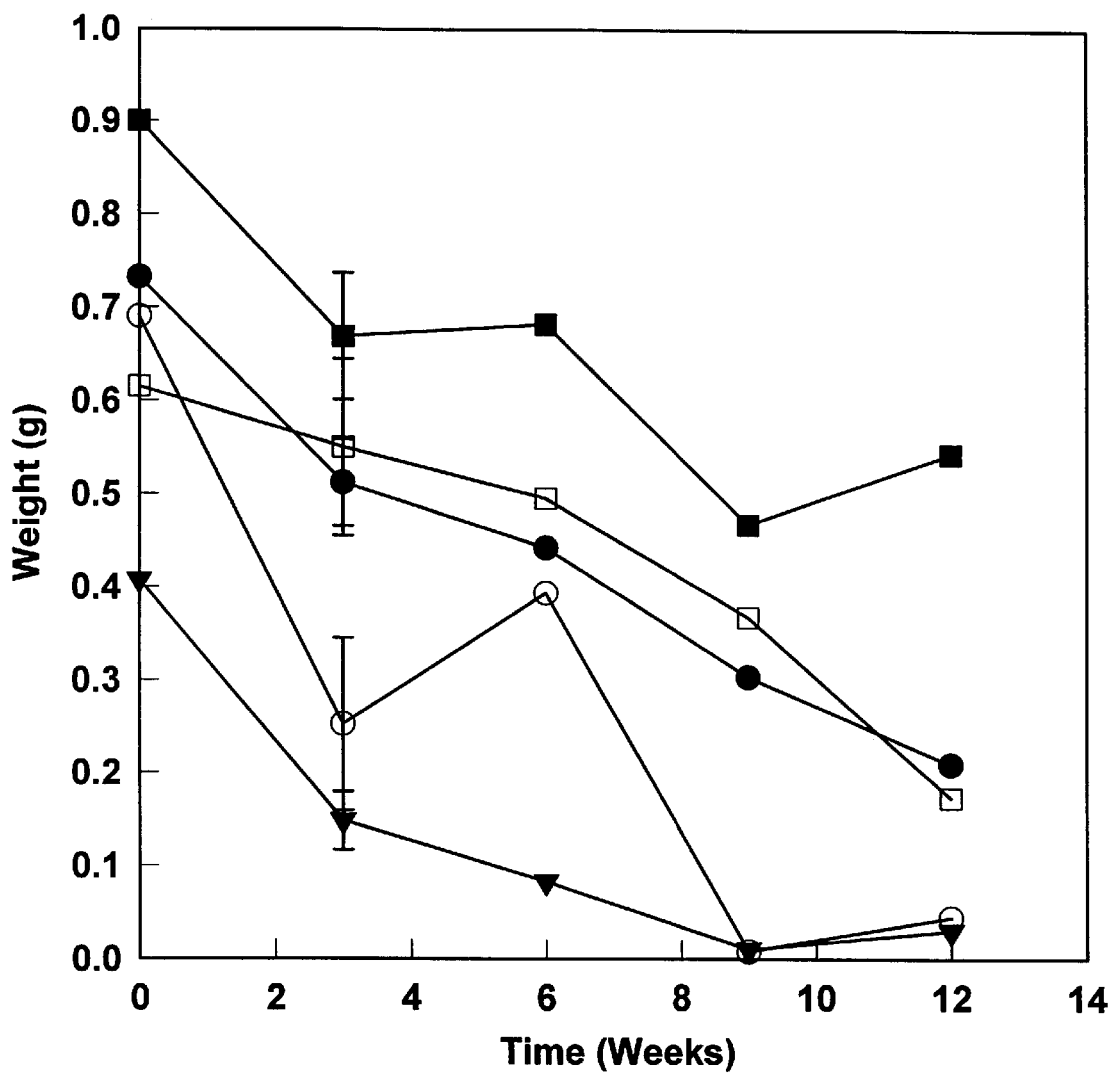
Figure 7:
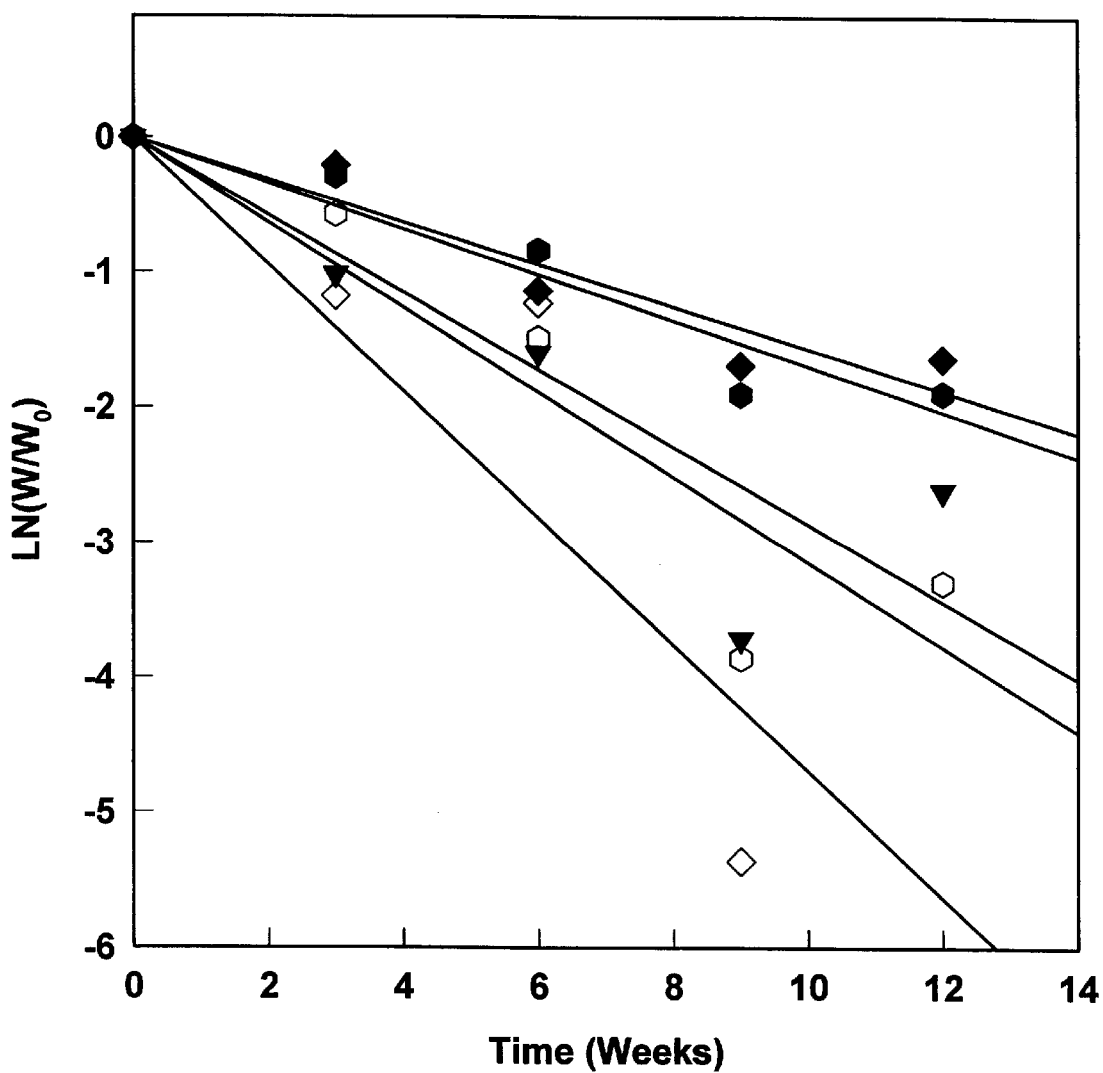
Figure 8:
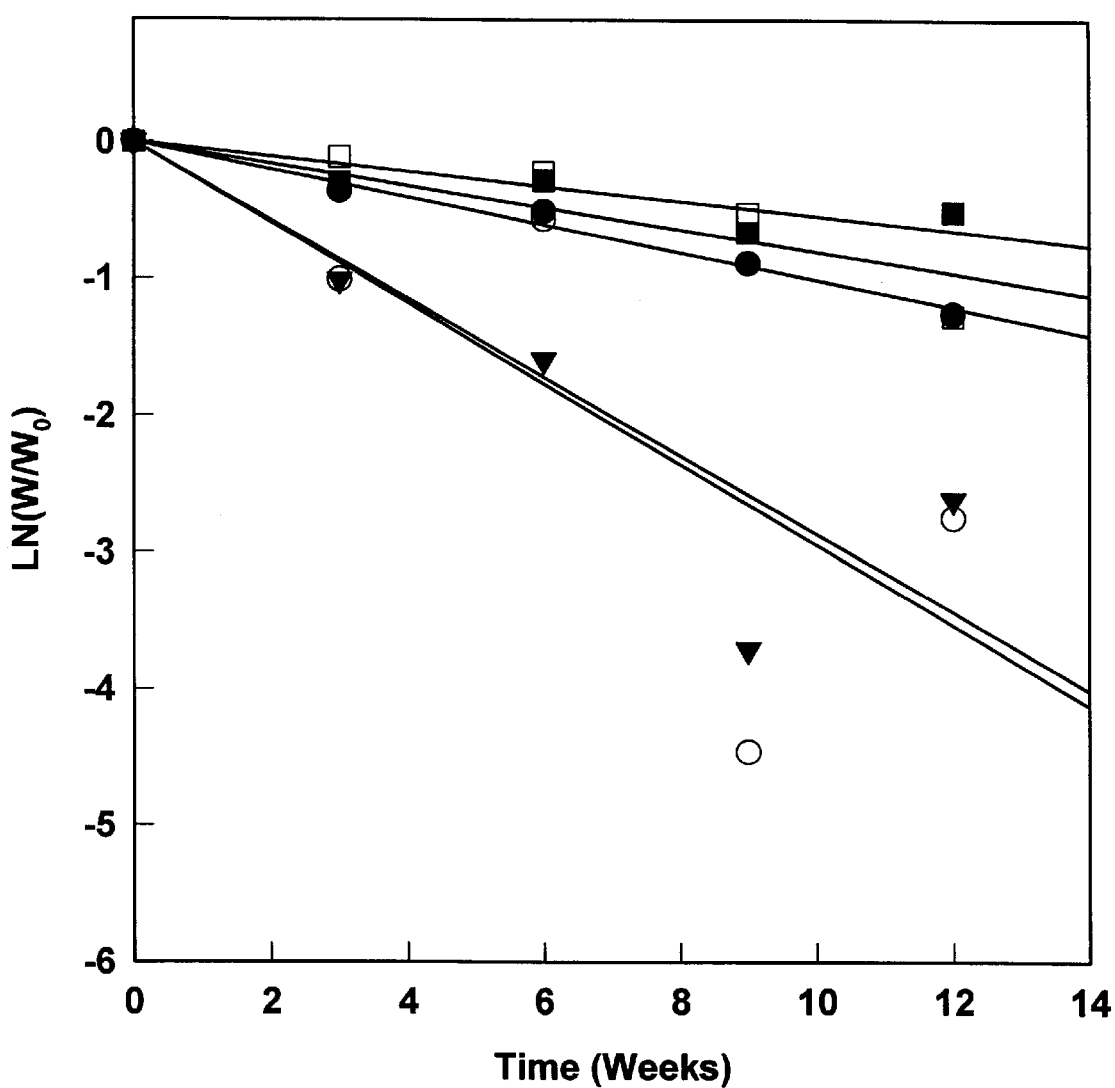

As shown in FIG. 4, elongations to break of coated and uncoated paper were 3±1% at 0 time. Interestingly, elongation values for coated papers increased to 7±1% after 2 weeks of soil exposure while those for uncoated paper remained unchanged. The reason for this is unknown, but could result from a decrease in fiber cohesion from rain or starch binder degradation, such that more of the load is transferred to the flexible resin.

Example 6

Figure 9:
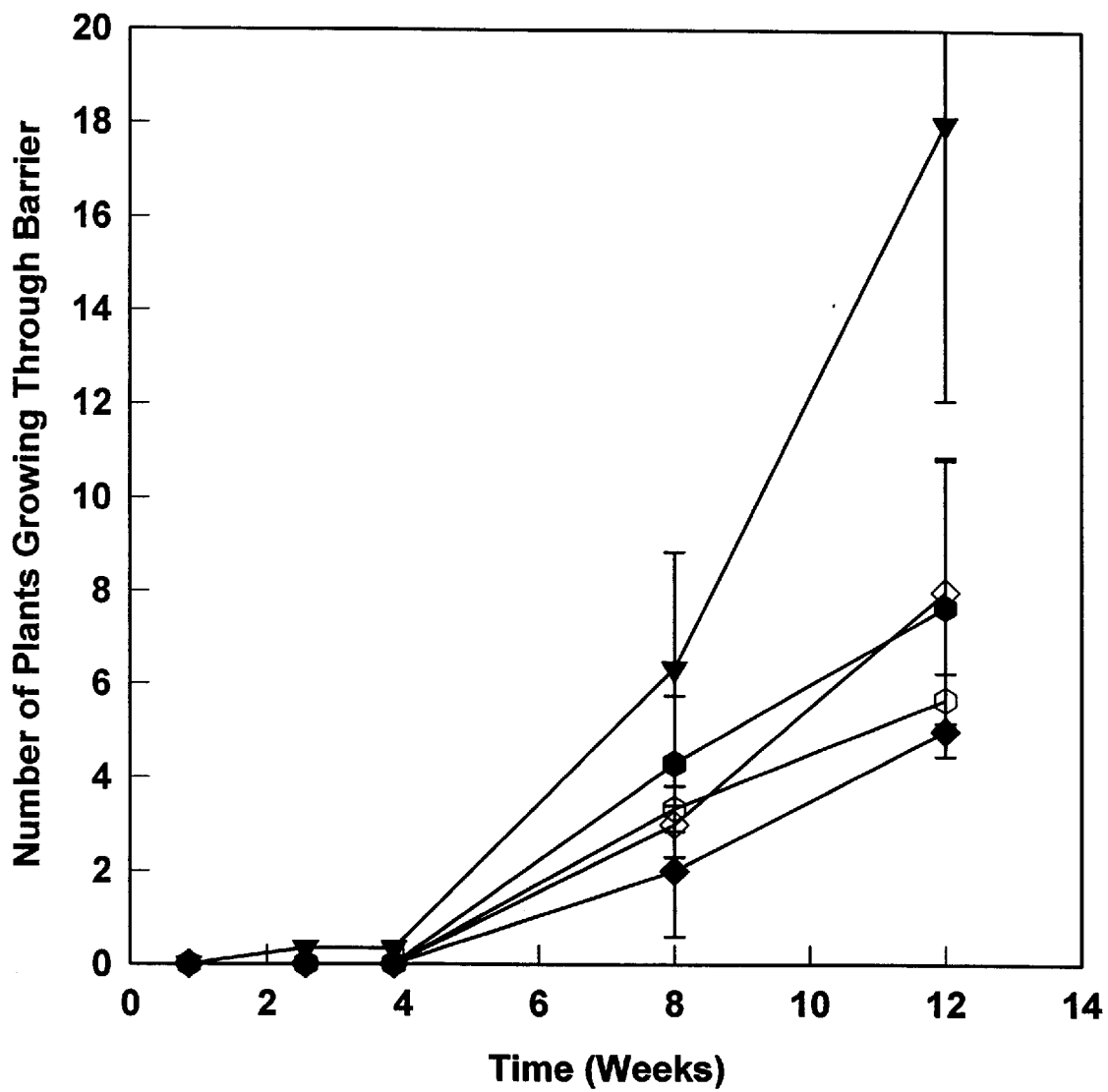
Figure 10:
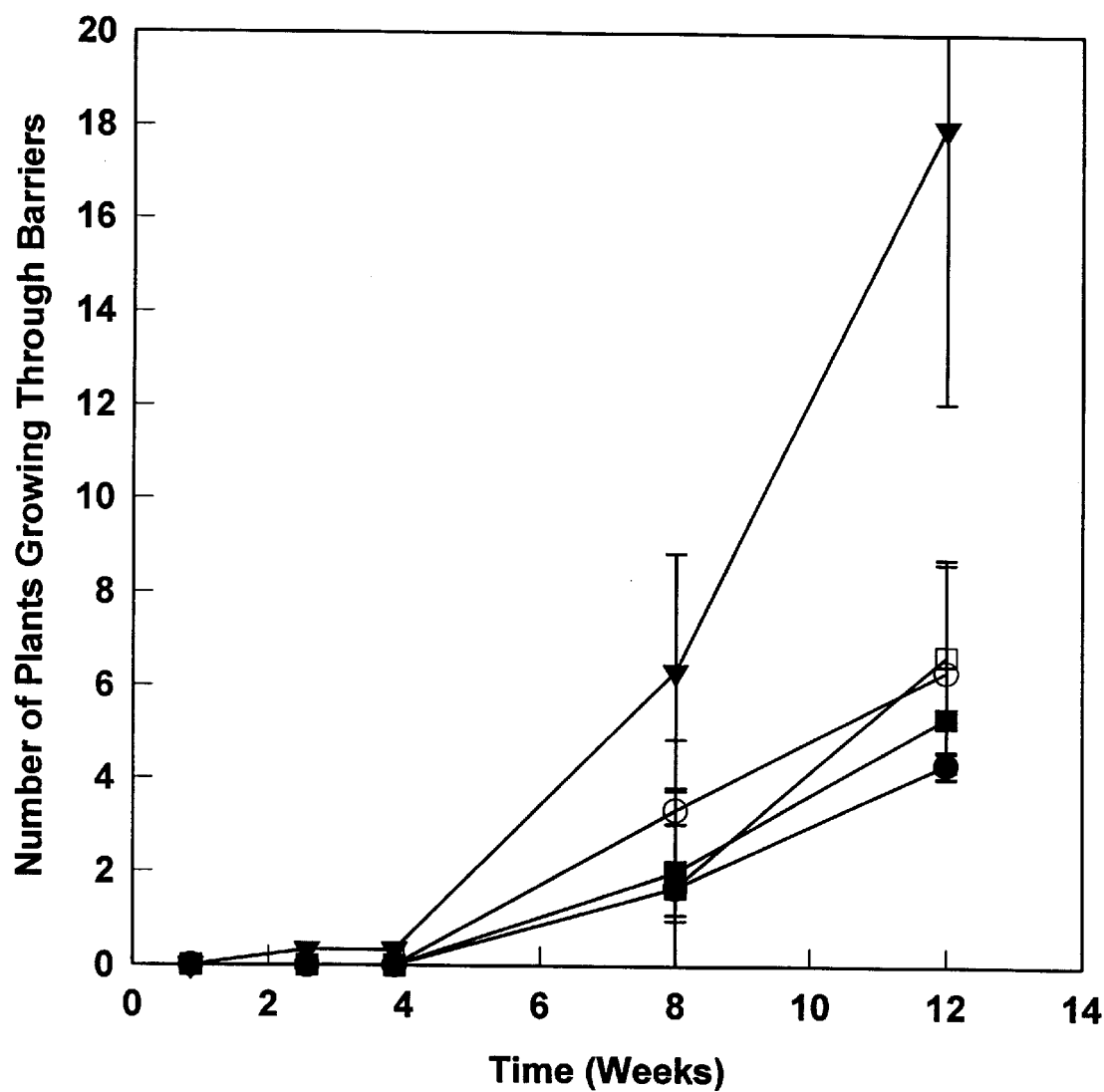

Kraft paper samples were coated with polymerized linseed oil as described in Example 1 and with epoxidized soybean oil-based polyesters as described in Example 2. Physical and functional properties of these coated samples were tested as described in Examples 3–5 as compared to kraft paper coated with uncross-linked soybean oil, linseed oil and paraffin wax. The uncross-linked soybean oil at the 39% add on level and the cross-linked soybean oil at the 25% add on level were applied to the paper with a paint sprayer. Tensile strength and elongation to break were determined by the previously-described procedures for both wet and dry samples. The results presented in Tables I A and I B show that the cross-linked coatings of the invention contribute significantly to the tensile strength and elongation to break of the wetted papers. The kinetic data for weight loss during soil burial are reported in Table II and in FIGS. 5–8. These data demonstrate a significant effect of the cross-linked coatings in the prolongation of the paper half life. Data regarding the effectiveness of the coated papers as plant barriers are shown in FIGS. 9 and 10.

TABLE I A

Dry and Wet Tensile Strengths of Kraft Paper Coated with Native and Polymerized Oils

| Coating | Polymerized (catalyst added) | Add on (%) | Tensile Strength (MPa) | | | |
|---|---|---|---|---|---|---|
| | | | Machine direction | | Transverse direction | |
| | | | Dry[1] | Wet[2] | Dry[1] | Wet[2] |
| none | no | 0 | 25 | 0.5 | 10 | 0.3 |
| soybean oil | no | 57 | 24 | 1.1 | 11 | 0.4 |
| soybean oil | no | 39 | 22 | 1.0 | 8.5 | |
| soybean oil | yes | 72 | 23 | 4.0 | 7.9 | 1.6 |
| soybean oil | yes | 25 | 22 | 0.8 | 13 | |
| linseed oil | no | 69 | 26 | 6.0 | 14 | 2.4 |
| linseed oil | yes | 80 | 34 | 9.6 | 20 | 4.3 |
| ESO/CA | yes | 140 | 24 | 10 | 12 | 4.1 |
| ESO/CA | yes | 51 | 25 | 8.8 | 13 | 3.2 |
| paraffin wax | no | 80 | 27 | 5.0 | 10 | 1.5 |

[1]equilibrated at 23° C., 50% relative humidity
[2]soaked in distilled water at 23° C. for 1 day

TABLE I B

Dry and Wet Elongations to Break of Kraft Paper Coated with Native and Polymerized Oils

| Coating | Polymerized (catalyst added) | Add on (%) | Elongation to Break (%) | | | |
|---|---|---|---|---|---|---|
| | | | Machine direction | | Transverse direction | |
| | | | Dry[1] | Wet[2] | Dry[1] | Wet[2] |
| none | no | 0 | 3.4 | 4.7 | 5.1 | 5.9 |
| soybean oil | no | 57 | 2.5 | 2.3 | 4.9 | 4.8 |
| soybean oil | no | 39 | 3.3 | 5.1 | 5.9 | |
| soybean oil | yes | 72 | 4.9 | 6.2 | 6.6 | 11 |
| soybean oil | yes | 25 | 2.5 | 3.5 | 4.9 | |
| linseed oil | no | 69 | 3.3 | 8.1 | 6.6 | 13 |
| linseed oil | yes | 80 | 3.5 | 8.1 | 6.6 | 13 |
| ESO/CA | yes | 140 | 3.5 | 8.9 | 8.1 | 11 |
| ESO/CA | yes | 51 | 2.9 | 7.5 | 5.3 | 12 |
| paraffin wax | no | 80 | 3.4 | 4.7 | 5.1 | 5.9 |

[1]equilibrated at 23° C., 50% relative humidity
[2]soaked in distilled water at 23° C. for 1 day

TABLE II

Kinetic Data for Weight Loss during Soil Burial of Kraft Paper Coated with Native and Polymerized Oils

| Coating | Polymerized (catalyst added) | Add on (%) | k: rate of weight loss[1] (week$^{-1}$) | t½: half life[2] (weeks) |
|---|---|---|---|---|
| none | no | 0 | 0.29 | 2.4 |
| soybean oil | no | 57 | 0.46 | 1.5 |
| soybean oil | no | 39 | 0.31 | 2.2 |
| soybean oil | yes | 72 | 0.15 | 4.4 |
| soybean oil | yes | 25 | 0.17 | 4.2 |
| linseed oil | no | 69 | 0.29 | 2.4 |
| linseed oil | yes | 80 | 0.1 | 6.9 |
| ESO/CA | yes | 140 | 0.054 | 12.8 |
| ESO/CA | yes | 51 | 0.080 | 8.6 |

[1]$k = (-\ln w/w_o)/t$
[2]$t_{½} = \ln(½)/k$

I claim:

1. A composition consisting essentially of a paper sheet and a treatment on at least one surface of the paper sheet, wherein said treatment consists essentially of a coating selected from the group consisting of:
   (1) a polymer having the structure of Formula I with the proviso that, when the polymer is derived from an unmodified drying oil, the drying oil is completely cross-linked;
   (2) a combination of:
      (a) a drying oil that will polymerize to yield a polymer having the structure of Formula I in a polymerization reaction; and
      (b) a catalyst to promote said polymerization reaction; and (3) a combination of:
- (a) a drying oil functionally modified by reacting the drying oil with (i) maleic anhydride and then a curing agent (ii) oxygen, (iii) an epoxidizing agent, or (iv) an epoxidizing agent and then curing agent, wherein said curing agent is selected from the group of polyols, polybasic acids, amines, polyamines, and polyphenols, and wherein said functionally modified drying oil will polymerize to yield a polymer having the structure of Formula I in a polymerization reaction; and
- (b) a catalyst to promote said polymerization reaction; wherein Formula I is:

Formula I

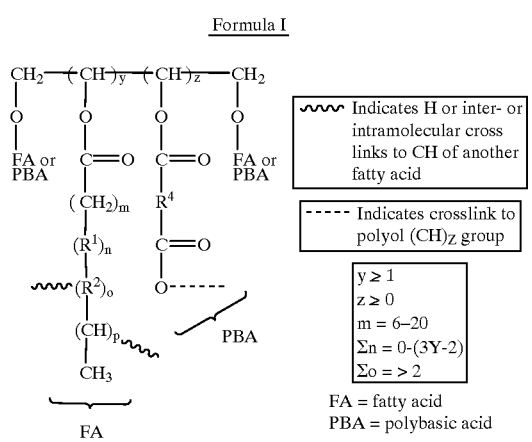

wherein:

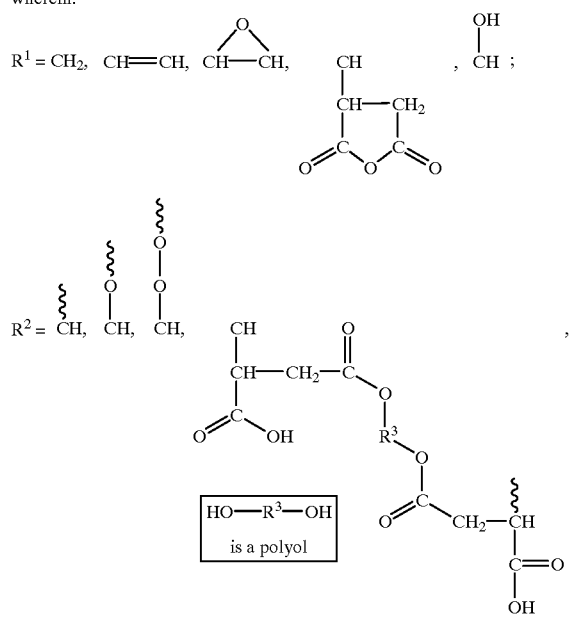

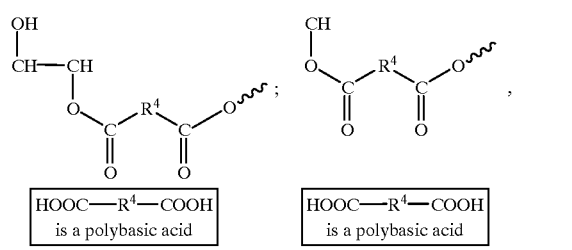

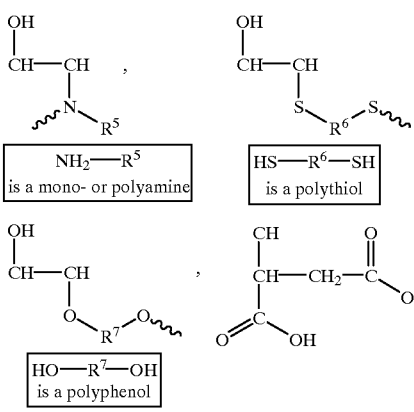

$$R^3 = -(CH_2)_q- \ (q=2-12), \ -CH_2-(CH)_q-CH_2- \ (q=1-6),$$

$$-CH(CH_3)-CH_2-;$$

$$R^4 = -(CH_2)_q- \ (q=2-12), \ -CH_2-(CH)_q-CH_2- \ (q=1-2),$$

$$-CH_2-CH(COOH)-CH_2-;$$

$$-CH(OH)-CH_2-$$
$$CH_2-CH=CH-(CH_2)_q-CH_3 \ (q=4-8),$$

(o-tolyl structure)

$$R^5 = -(CH_2)_q-CH_3 \ (q=0-12), \ -(CH_2)_q-NH_2 \ (q=2-12),$$

$$-(CH_2-CH_2-N(H))_q-H \ (q=2-6);$$

$$R^6 = -(CH_2)_q- \ (q=2-12); \text{ and}$$

$$R^7 = \text{(bisphenol-type structure)} \ (q=2-10);$$

wherein the exact arrangement of $CH_2$, $R^1$, $R^2$ and CH groups relative to one another depends on the type of fatty acid and on the rearrangement after radical activation or conjugation.

2. The composition of claim 1 wherein said coating is a polymer having the structure of Formula I.

3. The composition of claim 1 wherein said coating is a combination of (a) a drying oil that will polymerize to a polymer having the structure of Formula I in a polymerization reaction and (b) a catalyst to promote said polymerization reaction.

4. The composition of claim 3 wherein said drying oil is a vegetable oil.

5. The composition of claim 4, wherein said vegetable oil is polyunsaturated.

6. The composition of claim 5, wherein said vegetable oil is linseed oil.

7. The composition of claim 1, wherein said coating is a combination of (a) a functionally modified drying oil that will polymerize to yield a polymer having the structure of Formula I in a polymerization reaction and (b) a catalyst to promote said polymerization reaction.

8. The composition of claim 7, wherein said functionally modified drying oil is an epoxidized drying oil.

9. The composition of claim 7, wherein said functionally modified drying oil is the reaction product of an epoxidized drying oil and a curing agent, and the reaction product is characterized by having available sites for cross-linking.

10. The composition of claim 9, wherein said curing agent is selected from the group consisting of a polyol, polybasic acid, amine, polyamine, polythiol, and polyphenol.

11. The composition of claim 7, wherein said drying oil is a vegetable oil.

12. The composition of claim 11, wherein said vegetable oil is soybean oil.

13. The composition of claim 1, wherein said paper is kraft paper.

14. The composition of claim 1, wherein the amount of coating over a given area of paper averages at least 10% by weight of the paper in that area.

15. The composition of claim 1 wherein said paper sheet having the treatment on at least one surface is in a roll so that the surface having the treatment thereon is substantially protected from the ambient air by the opposite surface of said sheet.

16. A method for producing an agricultural mulch comprising applying to at least one surface of a paper sheet a treatment consisting essentially of a coating selected from the group consisting of:

(1) a polymer having the structure of Formula I with the proviso that, when the polymer is derived from an unmodified drying oil, the drying oil is completely cross-linked;

(2) a combination of:
    (a) a drying oil that will polymerize to yield a polymer having the structure of Formula I in a polymerization reaction; and
    (b) a catalyst to promote said polymerization reaction; and (3) a combination of:
    (a) a drying oil functionally modified by reacting the drying oil with (i) maleic anhydride and then a curing agent (ii) oxygen, (iii) an epoxidizing agent, or (iv) an epoxidizing agent and then curing agent, wherein said curing agent is selected from the group of polyols, polybasic acids, amines, polyamines, and polyphenols, and wherein said functionally modified drying oil will polymerize to yield a polymer having the structure of Formula I in a polymerization reaction; and
    (b) a catalyst to promote said polymerization reaction; wherein Formula I is:

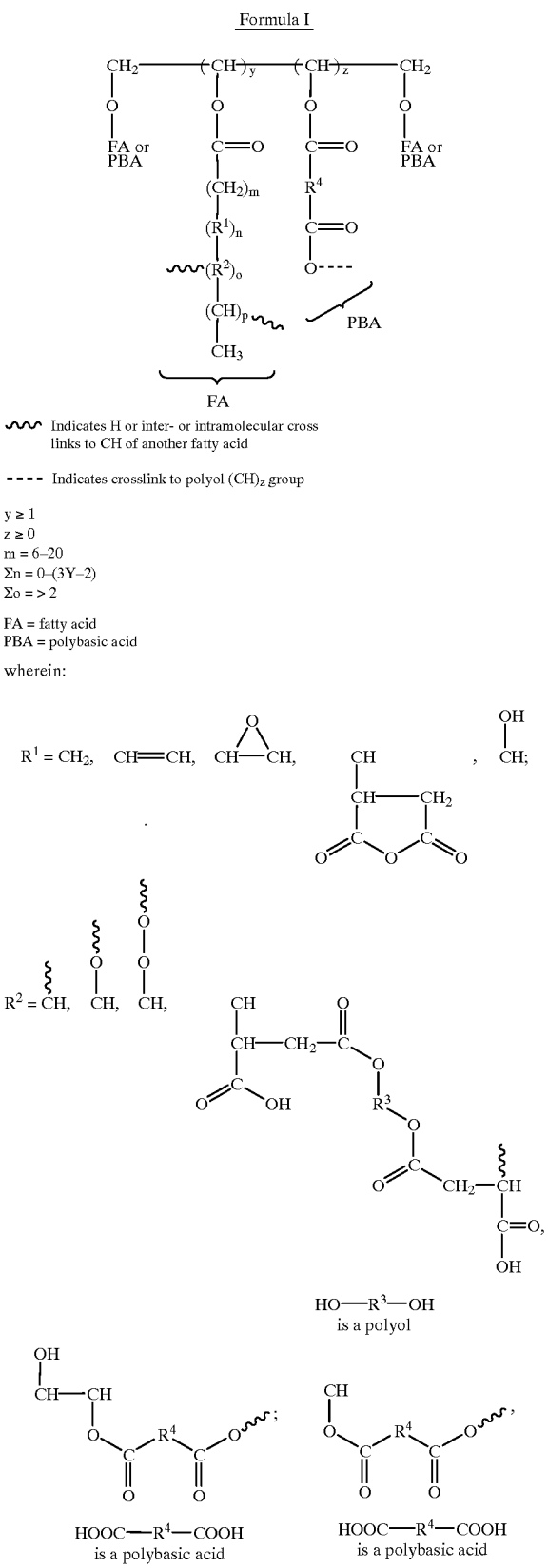

-continued

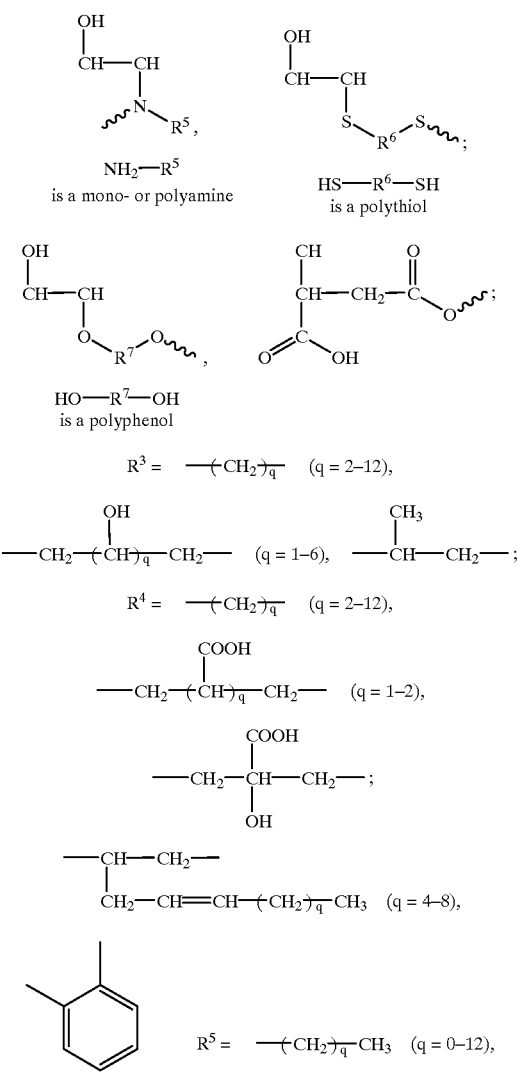

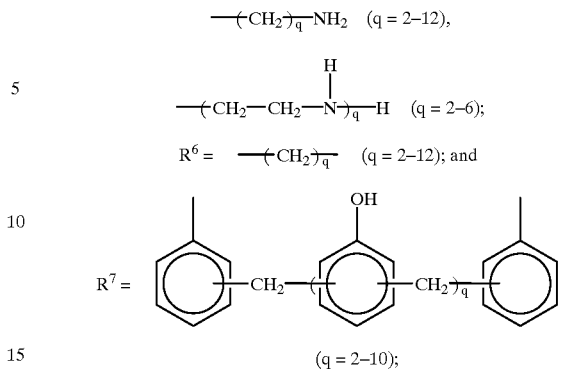

wherein the exact arrangement of $CH_2$, $R^1$, $R^2$ and CH groups relative to one another depends on the type of fatty acid and on the rearrangement after radical activation or conjugation.

17. The method of claim 16 wherein said paper sheet is wound into a roll after applying said coating but before completion of said polymerization reaction.

18. The method of claim 16, wherein said functionally modified drying oil is an epoxidized drying oil.

19. The method of claim 16, wherein said functionally modified drying oil is the reaction product of an epoxidized drying oil and a curing agent, and the reaction product is characterized by having available sites for cross-linking.

20. The method of claim 19, wherein said curing agent is selected from the group consisting of a polyol, polybasic acid, amine, polyamine, polythiol, and polyphenol.

21. The method of claim 19, wherein said drying oil is soybean oil.

22. The method of 16, wherein said paper is kraft paper and the amount of treatment over a given area of paper averages at least 10% by weight of the paper in that area.

* * * * *